(12) United States Patent
Ngai et al.

(10) Patent No.: US 8,135,995 B2
(45) Date of Patent: Mar. 13, 2012

(54) DIAGNOSTIC DATA REPOSITORY

(75) Inventors: Gary Ngai, Saratoga, CA (US);
Jonathan Klein, Redwood City, CA (US); Mark Ramacher, San Carlos, CA (US); Benoit Dageville, Foster City, CA (US); Hailing Yu, Sunnyvale, CA (US); Mike Feng, San Mateo, CA (US); Yair Sarig, San Mateo, CA (US); Marcus Fallen, Belmont, CA (US); John Beresniewicz, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 157 days.

(21) Appl. No.: 12/251,661

(22) Filed: Oct. 15, 2008

(65) Prior Publication Data
US 2009/0106601 A1    Apr. 23, 2009

Related U.S. Application Data

(60) Provisional application No. 60/981,456, filed on Oct. 19, 2007.

(51) Int. Cl.
*G06F 11/00* (2006.01)

(52) U.S. Cl. ............. 714/45; 714/47.3; 714/48; 714/57

(58) Field of Classification Search ....................... None
See application file for complete search history.

(56) References Cited

U.S. PATENT DOCUMENTS

| | | | |
|---|---|---|---|
| 4,866,635 A | 9/1989 | Kahn et al. | |
| 5,067,099 A | 11/1991 | McCown et al. | |
| 5,123,017 A | 6/1992 | Simpkins et al. | |
| 5,309,448 A | 5/1994 | Bouloutas et al. | |
| 5,845,272 A | 12/1998 | Morjaria et al. | |
| 5,920,489 A | 7/1999 | Dibrino et al. | |
| 5,922,079 A | 7/1999 | Booth et al. | |
| 5,968,122 A | 10/1999 | Schlosser et al. | |
| 6,012,152 A | 1/2000 | Douik et al. | |
| 6,125,311 A | 9/2000 | Lo | |

(Continued)

FOREIGN PATENT DOCUMENTS

EP    633536 A1    1/1995

OTHER PUBLICATIONS

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

(Continued)

*Primary Examiner* — Michael Maskulinski
(74) *Attorney, Agent, or Firm* — Kilpatrick Townsend & Stockton LLP

(57) ABSTRACT

Techniques for systematically gathering, organizing, and storing diagnostic data related to multiple monitored systems (e.g., multiple instances of a product or multiple products). A centralized repository is provided that is organized in a hierarchical manner to facilitate proper organization of the diagnostic data related to multiple monitored systems. In one embodiment, a root directory comprising one or more subdirectories is provided for storing diagnostic data collected for each monitored system. Multiple root directories may be provided under a common base directory for storing diagnostic data corresponding to multiple monitored systems. This enables correlation of diagnostic data across multiple monitored systems.

17 Claims, 5 Drawing Sheets

U.S. PATENT DOCUMENTS

| | | |
|---|---|---|
| 6,182,249 B1 | 1/2001 | Wookey et al. |
| 6,208,955 B1 | 3/2001 | Provan et al. |
| 6,237,114 B1 | 5/2001 | Wookey et al. |
| 6,243,628 B1 | 6/2001 | Bliley et al. |
| 6,349,335 B1 | 2/2002 | Jenney |
| 6,434,512 B1 | 8/2002 | Discenzo |
| 6,519,552 B1 | 2/2003 | Sampath et al. |
| 6,535,865 B1 | 3/2003 | Skaaning et al. |
| 6,539,337 B1 | 3/2003 | Provan et al. |
| 6,604,141 B1 | 8/2003 | Ventura |
| 6,615,090 B1 | 9/2003 | Blevins et al. |
| 6,633,782 B1 | 10/2003 | Schleiss et al. |
| 6,665,425 B1 | 12/2003 | Sampath et al. |
| 6,681,215 B2 | 1/2004 | Jammu |
| 6,697,810 B2 | 2/2004 | Kumar et al. |
| 6,697,962 B1 | 2/2004 | McCrory et al. |
| 6,738,811 B1 | 5/2004 | Liang |
| 6,782,345 B1 | 8/2004 | Siegel et al. |
| 6,862,698 B1 * | 3/2005 | Shyu .............................. 714/57 |
| 6,892,317 B1 | 5/2005 | Sampath et al. |
| 6,910,000 B1 | 6/2005 | Yedidia et al. |
| 6,915,128 B1 | 7/2005 | Oh |
| 6,944,800 B2 | 9/2005 | Brundridge et al. |
| 6,983,200 B2 | 1/2006 | Bodin et al. |
| 6,985,901 B1 | 1/2006 | Sachse et al. |
| 7,062,749 B2 | 6/2006 | Cyr et al. |
| 7,096,387 B2 | 8/2006 | Durrant et al. |
| 7,113,988 B2 | 9/2006 | Chirashnya et al. |
| 7,124,328 B2 | 10/2006 | Bowers et al. |
| 7,165,190 B1 | 1/2007 | Srivastava et al. |
| 7,177,769 B2 | 2/2007 | Larsson et al. |
| 7,257,744 B2 | 8/2007 | Sabet et al. |
| 7,281,040 B1 | 10/2007 | Ly |
| 7,281,170 B2 | 10/2007 | Taylor et al. |
| 7,308,385 B2 | 12/2007 | Wegerich et al. |
| 7,313,735 B1 | 12/2007 | Levergood et al. |
| 7,500,143 B2 | 3/2009 | Buia et al. |
| 7,525,910 B2 | 4/2009 | Wen |
| 7,546,222 B2 | 6/2009 | Chintalapti et al. |
| 7,577,872 B2 | 8/2009 | DiBartolomeo et al. |
| 7,603,674 B2 | 10/2009 | Cyr et al. |
| 7,668,953 B1 | 2/2010 | Sinclair et al. |
| 7,802,144 B2 | 9/2010 | Vinberg et al. |
| 7,937,623 B2 | 5/2011 | Ramacher et al. |
| 7,941,707 B2 | 5/2011 | Sarig et al. |
| 7,954,090 B1 | 5/2011 | Qureshi et al. |
| 8,032,625 B2 | 10/2011 | Benfield et al. |
| 2003/0033559 A1 | 2/2003 | Williams |
| 2003/0074607 A1 | 4/2003 | Brundridge et al. |
| 2004/0078683 A1 | 4/2004 | Buia et al. |
| 2004/0078695 A1 | 4/2004 | Bowers et al. |
| 2004/0078727 A1 * | 4/2004 | Little et al. .............. 714/48 |
| 2004/0153429 A1 | 8/2004 | Horn et al. |
| 2004/0193956 A1 | 9/2004 | Greenlee et al. |
| 2005/0102567 A1 | 5/2005 | McGuire et al. |
| 2005/0120273 A1 | 6/2005 | Hudson et al. |
| 2005/0160325 A1 | 7/2005 | Ogino et al. |
| 2005/0210331 A1 | 9/2005 | Connelly et al. |
| 2005/0228880 A1 * | 10/2005 | Champlin .................. 709/224 |
| 2006/0150156 A1 | 7/2006 | Cyr et al. |
| 2006/0200711 A1 | 9/2006 | Schondelmayer et al. |
| 2006/0256727 A1 | 11/2006 | Acharya et al. |
| 2007/0021966 A1 | 1/2007 | Ellefson et al. |
| 2007/0283329 A1 | 12/2007 | Caprihan et al. |
| 2007/0294003 A1 | 12/2007 | Underdal et al. |
| 2008/0065706 A1 | 3/2008 | Miller et al. |
| 2008/0109796 A1 | 5/2008 | Kosche |
| 2008/0125877 A1 | 5/2008 | Miller et al. |
| 2008/0133978 A1 | 6/2008 | Angamuthu et al. |
| 2008/0141072 A1 | 6/2008 | Kalgren et al. |
| 2008/0189488 A1 | 8/2008 | DeWitt et al. |
| 2008/0208784 A1 | 8/2008 | Hill et al. |
| 2008/0208787 A1 | 8/2008 | Luchene |
| 2008/0255885 A1 | 10/2008 | Eisenberger et al. |
| 2008/0263399 A1 | 10/2008 | Cousins et al. |
| 2008/0282095 A1 | 11/2008 | Haider et al. |
| 2008/0297375 A1 | 12/2008 | Khuzadi |
| 2009/0028055 A1 | 1/2009 | Zaencker et al. |
| 2009/0083576 A1 | 3/2009 | Vlassova et al. |
| 2009/0105982 A1 | 4/2009 | Sarig et al. |
| 2009/0105989 A1 | 4/2009 | Ramacher et al. |
| 2009/0105991 A1 | 4/2009 | Ramacher et al. |
| 2009/0106180 A1 | 4/2009 | Kuchibhotla et al. |
| 2009/0106262 A1 | 4/2009 | Fallen et al. |
| 2009/0106278 A1 | 4/2009 | Ramacher et al. |
| 2009/0106363 A1 | 4/2009 | Fallen et al. |
| 2009/0106589 A1 | 4/2009 | Ramacher et al. |
| 2009/0106595 A1 | 4/2009 | Sarig et al. |
| 2009/0106596 A1 | 4/2009 | Fallen et al. |
| 2009/0106605 A1 | 4/2009 | Kuchibhotla et al. |
| 2009/0327815 A1 | 12/2009 | Sridharan et al. |
| 2010/0100778 A1 | 4/2010 | Sullivan |
| 2010/0257410 A1 * | 10/2010 | Cottrell et al. ............... 714/45 |
| 2010/0318847 A1 | 12/2010 | Beg et al. |
| 2010/0318853 A1 | 12/2010 | Beg et al. |
| 2010/0318855 A1 | 12/2010 | Beg et al. |
| 2011/0153540 A1 | 6/2011 | Beg et al. |

OTHER PUBLICATIONS

U.S. Appl. No. 12/485,759, filed Jun. 16, 2009, Beg et al.

U.S. Appl. No. 12/485,763, filed Jun. 16, 2009, Beg et al.

U.S. Appl. No. 12/485,766, filed Jun. 16, 2009, Beg et al.

U.S. Appl. No. 12/641,038, filed Dec. 17, 2009, Beg et al.

Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.

Haicheng, W., et al., "Research on the Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.

Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].

Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].

Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.

Morjaria, M., et al., "Monitoring Complex Systems with Causal Networks," IEEE Computational Science & Engineering, vol. 3, Issue 4, Winter 1996, pp. 9-10.

Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].

Pearl, J., "Causal Diagrams for Empirical Research (With Discussions)," Technical Report R-218-B, Biometrika, vol. 82, No. 4, 1995, pp. 669-710, printed in Great Britain.

Pearl, J., "Causal Inference in Statistics: An Overview," Technical Report R-350 of Sep. 2009, Statistics Surveys, vol. 3, 2009, pp. 96-146.

Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.

Pearl, J., "Robustness of Causal Claims," Technical Report R-320 of Mar. 2004, Submitted to the 20th Conference on Uncertainty in Artificial Intelligence, Banff, Canada, Jul. 2004, 8 pages. [Can also be found in Proceedings of the 20th Conference on Uncertainty in Artificial Intelligence, AUAI Press, Arlington, VA, Jul. 2004, pp. 446-453.].

Pearl, J., "Simpson's Paradox: An Anatomy," Technical Report R-264, Extracted from Chapter 6 of Causality, Apr. 1999, pp. 1-11.
Pearl, J., "Statistics and Causal Inference: A Review," Test Journal, vol. 12, No. 2, Dec. 2003, pp. 281-345.
Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.
Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.
Tian, J., et al., "Probabilities of Causation: Bounds and Identification," Technical Report R-271-A of Feb. 2000, in Annals of Mathematics and Artificial Intelligence, vol. 28, 2000, pp. 287-313.
Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.
Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.
Zhang, D., et al., "Researches and Application of a Hybrid Fault Diagnosis Expert System," Proceedings of the $3^{rd}$ World Congress on Intelligent Control and Automation, Jun. 28-Jul. 2, 2000, Hefei, P.R. China, pp. 215-219, Copyright 2000 IEEE.
Non-Final Office Action for U.S. Appl. No. 12/251,671 mailed on Sep. 17, 2010; 13 pages.
Non-Final Office Action for U.S. Appl. No. 12/251,700 mailed on Jul. 19, 2010; 16 pages.
Non-Final Office Action for U.S. Appl. No. 12/252,056 mailed on Sep. 21, 2010; 17 pages.
Non-Final Office Action for U.S. Appl. No. 12/485,766 mailed on Jan. 25, 2011; 21 pages.
Notice of Allowance for U.S. Appl. No. 12/252,056 mailed on Jan. 6, 2011; 6 pages.
Notice of Allowance for U.S. Appl. No. 12/252,671 mailed on Jan. 5, 2011; 6 pages.
Final Office Action for U.S Appl. No. 12/251,700 mailed on Dec. 29, 2010; 14 pages.
Non-Final Office Action for U.S. Appl. No. 12/252,128 mailed on Dec. 23, 2010; 19 pages.
Non-Final Office Action for U.S. Appl. No. 12/485,759 mailed on Dec. 21, 2010; 21 pages.
Non-Final Office Action for U.S. Appl. No. 12/251,743 mailed on Dec. 14, 2010; 19 pages.
Non-Final Office Action for U.S. Appl. No. 12/251,711 mailed on Nov. 9, 2010; 18 pages.
Non-Final Office Action for U.S. Appl. No. 12/251,731 mailed on Mar. 2, 2011; 36 pages.
Non-Final Office Action for U.S. Appl. No. 12/251,677 mailed on Mar. 1, 2011; 24 pages.
Non-Final Office Action for U.S. Appl. No. 12/251,648 mailed on Mar. 1, 2011; 35 pages.
Office Communication for U.S. Appl. No. 12/251,671 mailed on Feb. 9, 2011; 4 pages.
Notice of Allowance for U.S. Appl. No. 12/251,700 mailed on Sep. 30, 2011, 10 pages.
Final Office Action for U.S. Appl. No. 12/251,731 mailed on Sep. 23, 2011, 23 pages.
Notice of Allowance for U.S. Appl. No. 12/251,667 mailed on Sep. 20, 2011, 9 pages.
Non-Final Office Action for U.S. Appl. No. 12/251,648 mailed on Sep. 20, 2011, 25 pages.
Non-Final Office Action for U.S. Appl. No. 12/252,070 mailed on Aug. 25, 2011, 7 pages.
Final Office Action for U.S. Appl. No. 12/252,128 mailed on Aug. 12, 2011, 10 pages.
Notice of Allowance for U.S. Appl. No. 12/251,711 mailed on Aug. 11, 2011, 1 page.
Notice of Allowance for U.S. Appl. No. 12/485,766 mailed on Aug. 10, 2011, 1 page.
Final Office Action for U.S. Appl. No. 12/485,759 mailed on Aug. 8, 2011, 12 pages.
Non-Final Office Action for U.S. Appl. No. 12/251,743 mailed on Jul. 19, 2011, 11 pages.
Non-Final Office Action for U.S. Appl. No. 12/251,685 mailed on May 31, 2011; 9 pages.
Final Office Action for U.S. Appl. No. 12/251,711 mailed on May 19, 2011; 6 pages.
Notice of Allowance for U.S. Appl. No. 12/251,700 (Dec. 29, 2011).
Office Action for U.S. Appl. No. 12/251,667 (Jan. 17, 2012).
Notice of Allowance for U.S. Appl. No. 12/251,711 (Nov. 7, 2011).
Office Action for U.S. Appl. No. 12/251,685 (Jan. 9, 2012).
Notice of Allowance for U.S. Appl. No. 12/252,128 (Dec. 12, 2011).
Notice of Allowance for U.S. Appl. No. 12/485,759 (Dec. 19, 2011).
Notice of Allowance for U.S. Appl. No. 12/485,766 (Nov. 9, 2011).

* cited by examiner

DIAGNOSTIC DATA REPOSITORY

CROSS-REFERENCES TO RELATED APPLICATIONS

This application claims the benefit and priority under 35 U.S.C. 119(e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 12/252,056 entitled DIAGNOSABILITY SYSTEM;
(2) U.S. application Ser. No. 12/251,648 entitled RULE-BASED ENGINE FOR GATHERING DIAGNOSTIC DATA;
(3) U.S. application Ser. No. 12/251,731 entitled GATHERING CONTEXT INFORMATION USED FOR ACTIVATION OF CONTEXTUAL DUMPING;
(4) U.S. application Ser. No. 12/251,743 entitled USER-TRIGGERED DIAGNOSTIC DATA GATHERING;
(5) U.S. application Ser. No. 12/251,711 entitled NON-INTRUSIVE GATHERING OF DIAGNOSTIC DATA USING ASYNCHRONOUS MECHANISMS.
(6) U.S. application Ser. No. 12/251,667 entitled DIAGNOSABILITY SYSTEM: FLOOD CONTROL;
(7) U.S. application Ser. No. 12/251,671 entitled GATHERING INFORMATION FOR USE IN DIAGNOSTIC DATA DUMPING UPON FAILURE OCCURRENCE;
(8) U.S. application Ser. No. 12/251,685 entitled SCRUBBING AND EDITING OF DIAGNOSTIC DATA;
(9) U.S. application Ser. No. 12/251,700 entitled INTELLIGENT COLLECTION OF DIAGNOSTIC DATA FOR COMMUNICATION TO DIAGNOSIS SITE;
(10) U.S. application Ser. No. 12/252,070 entitled HEALTH METER;
(11) U.S. application Ser. No. 12/252,128 entitled HEALTH MONITOR.

BACKGROUND OF THE INVENTION

The present invention relates to system maintenance and diagnosis, and more particularly to techniques for gathering, organizing, and storing diagnostic data related to a monitored system.

Diagnosing defects in systems, such as Oracle database (DB) products, can be a complex and time-consuming task. In a complex software environment, the diagnostic data required to resolve an issue or problem can come from different sources and may be stored in multiple locations and in various different formats. For example, for a system comprising multiple components, the state of the various components may be held in different log files, diagnostic traces corresponding to the components, etc. The information stored in different log files and diagnostic traces may be stored in different formats. The diagnostic data may be stored in different locations such as in different repositories.

In a typical diagnostic flow, diagnostic data captured at system site (e.g., a customer site executing one or more product instances) is communicated to a diagnosis site (e.g., the site of the product vendor) for failure analysis. At the diagnosis site, the data received from the system site is analyzed to determine, for example, occurrence of an error in the system, a root cause of the error, recommendations for mitigating effects of the errors, repair solutions to fix the error, and the like. The results of the analysis may be communicated from the diagnosis site to the system site.

Due to the sheer amount of diagnostic data that may be captured for a monitored system and the often disorganized manner in which the data is gathered and stored at the monitored system site, it is often a difficult to establish what diagnostic data is available at for the monitored system and where the data is stored. Further, it is also very difficult and time consuming to identify what pieces of diagnostic data need to be submitted to the vendor for analysis. If too little information is provided to the vendor, the amount of submitted data may be insufficient to perform a proper diagnosis of the error. In such a case, the vendor then has to often contact the customer again and request additional information, some of which might no longer be available. Further analysis is possible only after receiving the additional requested information. This may take several back-and-forth trips between the customer and vendor before the error can be diagnosed. On the other hand, sending too much diagnostic data to the vendor is also problematic. The amount of diagnostic data that is collected for a monitored system may include thousands of files and many gigabytes of data. Sending such a large volume of data to the diagnosis site is cumbersome, time consuming, and expensive. Some of the data to be sent in this case may also contain confidential information that may be hard for the sending site to determine and eliminate. Further, if the data received at a diagnosis site is very large, it takes the vendor a long time to analyze the received diagnostic data to identify relevant pieces of data within that data for analyzing the root cause of the problem. Accordingly, under either scenario, developers at the vendor's diagnosis site cannot locate relevant diagnostic information in a timely manner. As a result, the time needed to resolve the issue or problem is increased, leading to customer dissatisfaction.

Further, conventional systems also lack the ability to correlate problems occurring up-stream and/or down-stream in the product stack or across different product instances that may be useful for diagnosis of the problem that caused the error.

BRIEF SUMMARY OF THE INVENTION

Embodiments of the present invention provide techniques for systematically gathering, organizing, and storing diagnostic data related to multiple monitored systems (e.g., multiple instances of a product or multiple products). A centralized repository is provided that is organized in a hierarchical manner to facilitate proper organization of the diagnostic data related to multiple monitored systems. In one embodiment, a root directory comprising one or more subdirectories is provided for storing diagnostic data collected for each monitored system. Multiple root directories may be provided under a common base directory for storing diagnostic data corresponding to multiple monitored systems. This enables correlation of diagnostic data across multiple monitored systems.

According to an embodiment of the present invention, techniques are provided for gathering, organizing, and storing diagnostic data related to multiple monitored systems (e.g., multiple instances of a product or multiple products). Diagnostic data related to a first monitored system may be stored in a first directory in the diagnostic data repository. Diagnostic data related to a second monitored system may be stored in a second directory in the diagnostic data repository. The first directory and the second directory may be stored under a common directory in the diagnostic data repository.

In one embodiment, storing the diagnostic data related to the first monitored system may comprise storing diagnostic data related to a first product instance. The diagnostic data related to the first monitored system may be stored in one or more subdirectories in the first directory.

In one embodiment, storing the diagnostic data related to the second monitored system may comprise storing diagnostic data related to a second product instance. The diagnostic data related to the second monitored system may be stored in one or more subdirectories in the second directory.

In one embodiment, storing the diagnostic data related to the first monitored system comprises storing information related to one or more incidents for the first monitored system, metadata information, wherein the metadata information including one or more correlation keys, information related to one or more health checks for the first monitored system, information related to packaged diagnostics that is to be communicated to a diagnosis site, information related to one or more problems, and other information.

In one embodiment, the diagnostic data related to the first monitored system is stored in one or more tables. A portion of the diagnostic data related to the first monitored system may be automatically deleted from the diagnostic data repository based upon a user-configurable retention policy.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for systematically gathering, organizing, and storing diagnostic data related to multiple monitored systems (e.g., multiple instances of a product or multiple products). A centralized repository is provided that is organized in a hierarchical manner to facilitate proper organization of the diagnostic data related to multiple monitored systems. In one embodiment, a root directory comprising one or more subdirectories is provided for storing diagnostic data collected for each monitored system including diagnostic data related to one or more incidents that are created in response to one or more conditions detected in the monitored system. Multiple root directories may be provided under a common base directory for storing diagnostic data corresponding to multiple monitored systems. This enables correlation of diagnostic data across multiple monitored systems.

Figure 1:
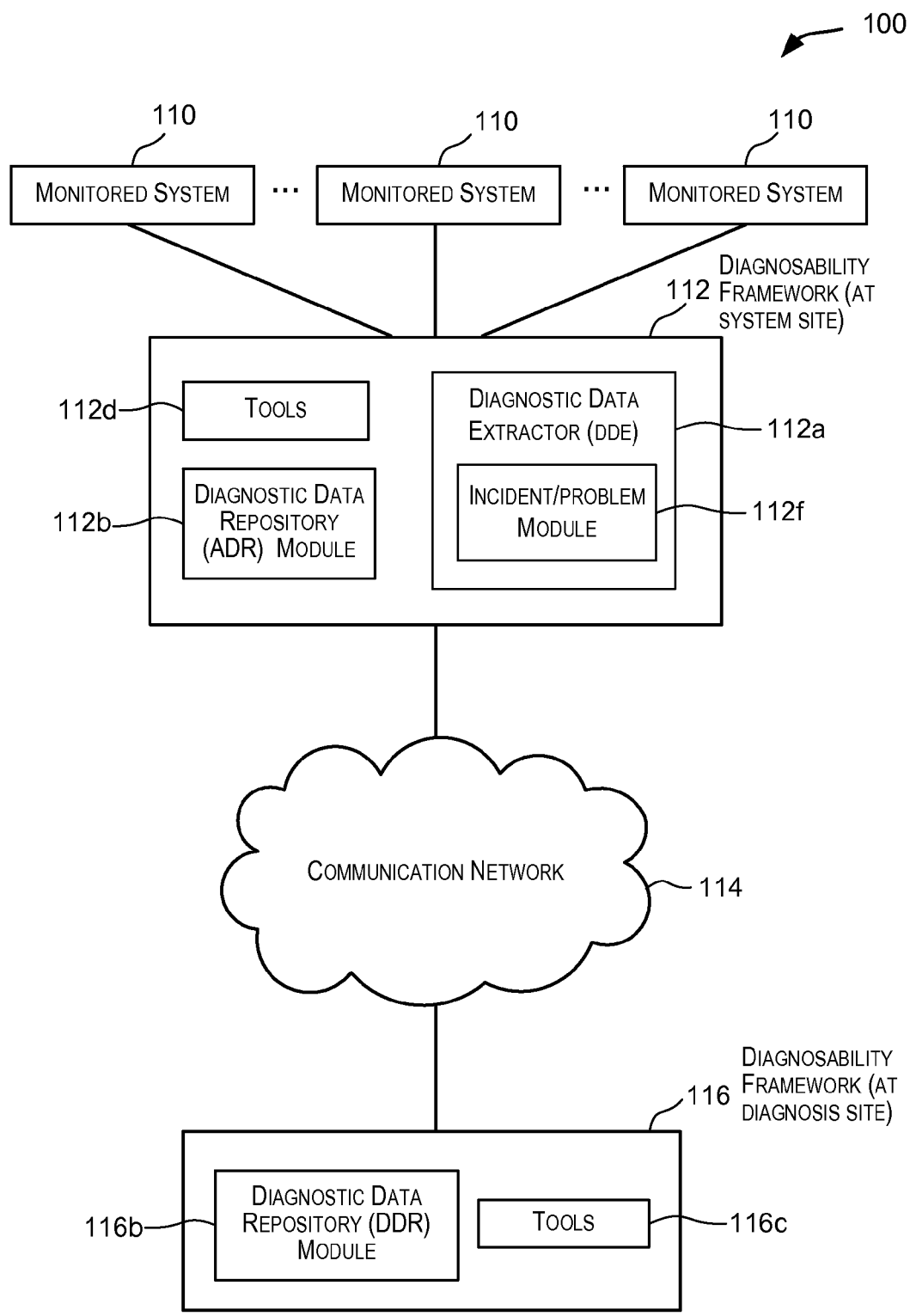
FIG. 1 is a simplified block diagram illustrating a diagnosability system according to an embodiment of the present invention.

FIG. 1 is a simplified block diagram of a diagnosability system 100 according to an embodiment of the present invention. Diagnosability system 100 facilitates collection, storage, communication, and analysis of diagnostic data for one or more monitored systems 110 (which may be different products or different instances of the same product). Monitored system 110 may be a software system, a hardware system, an enterprise system, and like. For example, monitored system 110 may be a complex enterprise software system such as a database system and related products, such as products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be for example a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store diagnostic data related to monitored system 110. The diagnostic data collected and stored by diagnosability framework 112 may include, for example, trace data, diagnostic dumps, health check reports, data repair records, logs (e.g., error logs), results of diagnosability actions, and the like. Periodically, or in response to a condition detected in system 110, portions of the diagnostic data stored by diagnosability framework 112 may be communicated to diagnosability framework 116 located at the diagnosis site for analysis, such as failure analysis. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises a diagnostic data extractor (DDE) 112a, a diagnostic data repository (ADR) module 112b, and various tools 112d. The various components depicted in diagnosability framework 112 are merely examples of components that may be included in diagnosability framework 112. In alternate embodiments, diagnosability framework 112 may have less or more components than those shown. The components in diagnosability framework 112 may be implemented in software (e.g., code, program, instructions that are stored on a machine-readable medium and executed by a processor), hardware, or combinations thereof.

In one embodiment, DDE 112a is configured to determine one or more diagnostic actions to be performed in response to a condition detected in system 110. In one embodiment, the condition detected in system 110 is an error detected in system 110. The diagnostic actions determined by DDE 112a may include determining and gathering diagnostic data that is deemed to be relevant to the condition detected in monitored system 110, recommending one or more actions to be performed (e.g., actions to collect additional diagnostic data), invoking health checks in monitored system 110, and the like. For example, DDE 112a may determine the relevant diagnostic data that is to be collected for a condition detected in system 110 based on a set of one or more rules configured for the monitored system and based upon context data determined for the condition detected in system 110. DDE 112*a* or other modules in diagnosability framework 112 may then collect the diagnostic data that is relevant to the detected condition in system 110 and store the relevant diagnostic data collected in ADR module 112*b*. Further information regarding DDE 112*a* and its functions can be found in the applications incorporated by reference in the present application.

ADR module 112*b* (also sometimes referred to as DDR in the applications incorporated by reference in the present application) provides a centralized unified repository for storing diagnostic data related to multiple monitored systems. In one embodiment, ADR module 112*b* provides a file-based repository for storing the diagnostic data collected by diagnosability framework 112. The diagnostic data is stored in ADR module 112*b* in an organized manner that enables analysis, including searching and database-like querying, of the data and also enables the data to be used by various diagnosis tools. Various different types of data may be stored in ADR module 112*b* including traces, dumps, alert logs, health monitor reports, data repair records, metadata information, and the like.

In one embodiment, ADR module 112*b* stores diagnostic data related to monitored system 110. The diagnostic data related to monitored system 110 may be organized systematically in ADR module 112*b* to facilitate efficient and effective diagnosis of conditions detected in system 110. In one embodiment, an incident is created by incident module 112*f* in response to a condition detected in system 110. Alternatively, an incident may be created manually by a user via a user interface 202 (e.g., command line interface or a web-based user interface) or by some other modules in the diagnosability framework 112.

In one embodiment, an incident represents a single occurrence of an error condition detected in monitored system 110. An error condition detected in system 110 may be classified as a critical error. An error may be considered a critical error if the error is caused due to the working of monitored system 110 itself as opposed to an error caused by a client or user's improper use of system 110. For example, a critical error may be an internal error, a system access violation, or some external error (e.g., an object being accessed no longer exists). Another type of error condition detected in system 110 may be classified as a soft assert. An error may be considered a soft assert if the error does not cause immediate harm to the monitored system. For example, leaving a file open rather than closing it when the process ends can be viewed as a soft assert—its an error, but not harmful typically. In one embodiment, ADR module 112*b* stores diagnostic data related to various incidents that are created in response to error conditions detected in system 110.

Various different types of diagnostic data may be collected and stored for an incident including: (1) a system-assigned unique incident identifier (ID); (2) a problem key (e.g., a text string) that characterizes the incident; (3) one or more incident attributes that describe the state of the incident such as the time of occurrence of the incident, incident status such as open or close (see detail description below), severity of the incident, and other attributes that describe the incident; (4) one or more correlation keys such as one or more (key, value) pairs (e.g., "key" is an arbitrary name related to some attributes of the incident such as "SESSION_ID", "PROCESS_ID", "EXECUTION_CONTEXT_ID" and "value" is a specific value that is assigned for the specific incident attribute) that can be used for correlations across multiple incidents, multiple product instances, multiple products that are managed by diagnosability framework 112, and the like; (5) metadata that describes the incident (e.g., the metadata information may include the above-described correlation keys that are used for correlation of incidents); (6) one or more incident dumps collected and stored for the incident; and other information related to the incident.

In one embodiment, one or more incidents having the same associated problem keys are mapped to a problem. A problem may be considered as a set of incidents that are perceived to have the same symptoms. In this manner, incidents that have the same associated problem keys can be grouped under a single problem representing a specific symptom. Various different types of diagnostic data may be gathered and stored for a problem in ADR module 112*b* including: (1) a system-defined unique identifier (problem ID) for the problem; (2) a problem key that characterizes the faulty behavior or symptom associated with the problem; (3) information that describes occurrences of incidents related to the problem including information related to the first occurrence of an incident categorized under the problem and the most recent occurrence of an incident categorized under the problem; (5) impact of the problem on the monitored system; (6) metadata that describes the problem; and other information related to the problem.

In one embodiment, the data stored in ADR module 112*b* may be tagged or annotated with metadata information. The metadata information may be stored as one or more database tables in ADR module 112*b*. The metadata information may be used to find correlations between pieces of the data stored in ADR module 112*b*. The metadata also enables navigation of the stored data in ADR module 112*b*. For example, one or more correlation keys that are associated with an incident may be stored in ADR module 112*b* and used for correlation of incidents across multiple incidents, multiple product instances, multiple products that are managed by diagnosability framework 112, and the like.

Incidents and problems provide a convenient and systematic way to organize the diagnostic data gathered for monitored system 110 and stored in ADR module 112*b*. Further, this organization also helps to effectively reduce the amount of diagnostic data that is collected for monitored system 110. For example, instead of collecting and storing diagnostic data for each of multiple incidents having the same problem key and symptom, diagnostic data may be collected and stored for only a controlled number of incidents thereby reducing the collection and storage of potentially redundant data.

Such an organization of the diagnostic data in ADR module 112*b* also facilitates identification of diagnostic data to be sent to diagnosis site 116 and communication of the identified data to the diagnosis site. Further, diagnostic data that is relevant for problem analysis can be easily identified and packaged for transfer to the diagnosis site in one single trip. This prevents the multi-trip approach needed in conventional systems. For example, a packaging component (part of diagnosability framework 112) may be configured to, in response to an error, locate and package all of the correlated incidents and problems and ship them to the diagnosis site in one single trip. This reduces the time needed for determining and solving the problem.

As indicated above, ADR module 112*b* stores diagnostic data in a format that facilitates analysis of the diagnostic data. In one embodiment, ADR module 112*b* is organized in a hierarchical manner to facilitate proper organization of the diagnostic data. For example, a root directory may be provided to represent a monitored system such as system 110 and diagnostic data related to the monitored system may be stored under that directory. The diagnostic data itself may be organized hierarchically into one or more subdirectories under the directory representing the monitored system. Multiple directories may be provided corresponding to multiple monitored systems (e.g., multiple instances of a product or multiple products). Directories representing multiple monitored systems may be organized under a common base directory. This enables correlation of diagnostic data across multiple monitored systems.

For example, in one embodiment, diagnostic data stored for a monitored system may be stored under a directory (e.g., a ADR_HOME directory) allocated to that system. Multiple ADR_HOME directories may be provided corresponding to multiple monitored systems. The ADR_HOME directories share a common structure to facilitate analysis of the stored data across multiple monitored systems. Multiple ADR_HOME directories may be organized under a ADR_BASE directory to enable correlation of diagnostic data across multiple monitored systems.

Referring back to FIG. 1, various tools 112d may be provided as part of diagnosability framework 112. These tools may include tools for querying the diagnostic data or information stored in ADR module 112b, tools for generating reports, analysis tools, and other tools that may use information collected and stored by diagnosability framework 112. Further information regarding tools 112d can be found in the applications incorporated by reference in the present application.

As mentioned previously, the diagnostics data collected by diagnosability framework 112 may also be forwarded to diagnosability framework 116 deployed at diagnosis site 116 for analysis. As depicted in FIG. 1, diagnosability framework 116 may comprise an ADR module 116b and one or more tools 116c.

In one embodiment, ADR module 116b provides a repository for storing data received from diagnosability framework 112. The structure of ADR module 116b may be the same as the structure of ADR module 112b at system sites. This facilitates efficient storage and analysis of the data received from diagnosability framework 112. For example, in one embodiment, diagnostic data received from a monitored system site is stored in the same directory locations in ADR module 116b as the data that was stored in ADR module 112b in diagnosability framework 112.

Various tools 116c may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 16 may be implemented in software, hardware, or combinations thereof.

While incident module 112f is shown as part of diagnostic data extractor (DDE) 112a in FIG. 1, in alternative embodiments incident module 112f may be part of some other component of diagnosability framework 112 or may even be a standalone module. Information related to the various other components of diagnosability system 100 may be found in the applications incorporated by reference in the present application.

Figure 2:
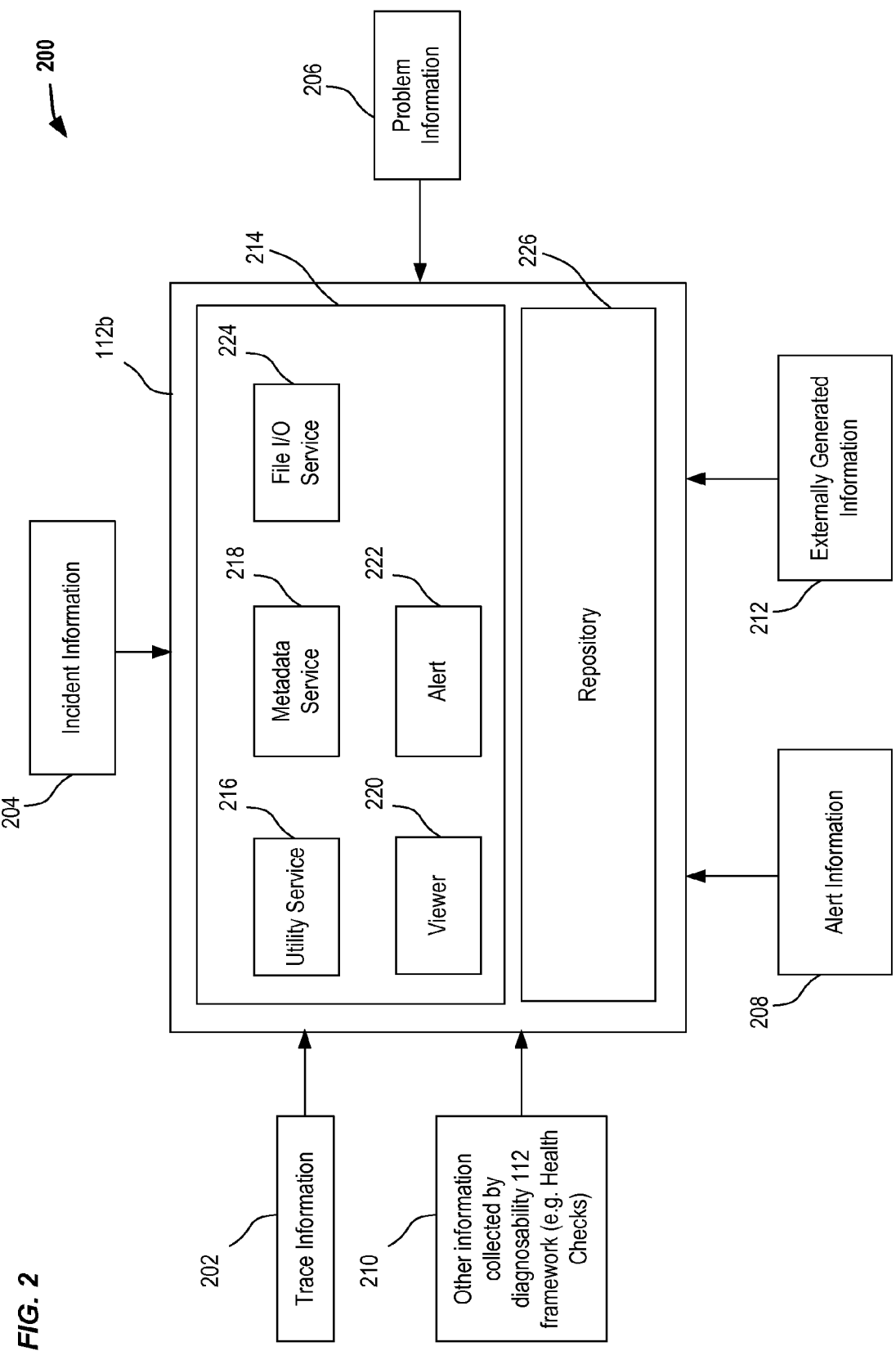
FIG. 2 is a simplified block diagram depicting a diagnostic data repository (ADR) module according to an embodiment of the present invention.

FIG. 2 is a simplified block diagram depicting a diagnostic data repository (ADR) module 112b according to an embodiment of the present invention. The various components depicted in FIG. 2 are merely examples of components that may be included in ADR module 112b. In alternate embodiments, FIG. 2 may include less or more components than those shown in FIG. 2. The components depicted in FIG. 2 may be implemented in software (e.g., code, program, instructions that are stored in a machine-readable medium and executed by a processor), hardware, or combinations thereof.

As mentioned previously, ADR module 112b is configured to provide a centralized repository for storing diagnostic data collected by diagnosability framework 112. In one embodiment, ADR module 112b includes a repository 226 that is configured as a filed-based hierarchical data store for storing various different types of data including traces, dumps, alert logs, health monitor reports, data repair records, metadata information, and the like.

In one embodiment, diagnostic data stored in repository 226 is stored in an hierarchical structure. For example, a root directory may be provided in repository 226 to represent a monitored system such as system 110 and diagnostic data related to the monitored system may be stored under that directory. Multiple root directories may be provided in repository 226 corresponding to multiple monitored systems, which may be instances of the same product or of a different product. Directories representing multiple monitored systems may be organized under a common base directory. For example, a first directory may store diagnostic data for an instance of product X, a second directory may store diagnostic data for another instance of product X, a third directory may store diagnostic data for an instance of product Y, and so on. In this manner, diagnostic data for multiple monitored systems may be stored in one centralized location under one common base directory. Different instances of ADR module 112b may have the same general structure of a common base directory under which there are one or more root directories corresponding to multiple monitored systems. This consistent and organized manner of storing diagnostic data enables tools to navigate and extract related diagnostic information across multiple monitored systems without having specific knowledge about the structure of each individual directory that corresponds to a particular monitored system.

In addition to the root directories provided for storing diagnostic data for multiple monitored systems, a separate root directory may be provided for storing diagnostics data related to diagnosability framework 112. Diagnosability framework 112 itself is thus treated as any other monitored system. In this manner, tools and other services built as part of diagnosability framework 112 also can be used on diagnostic data gathered for diagnosability framework 112.

Figure 3:
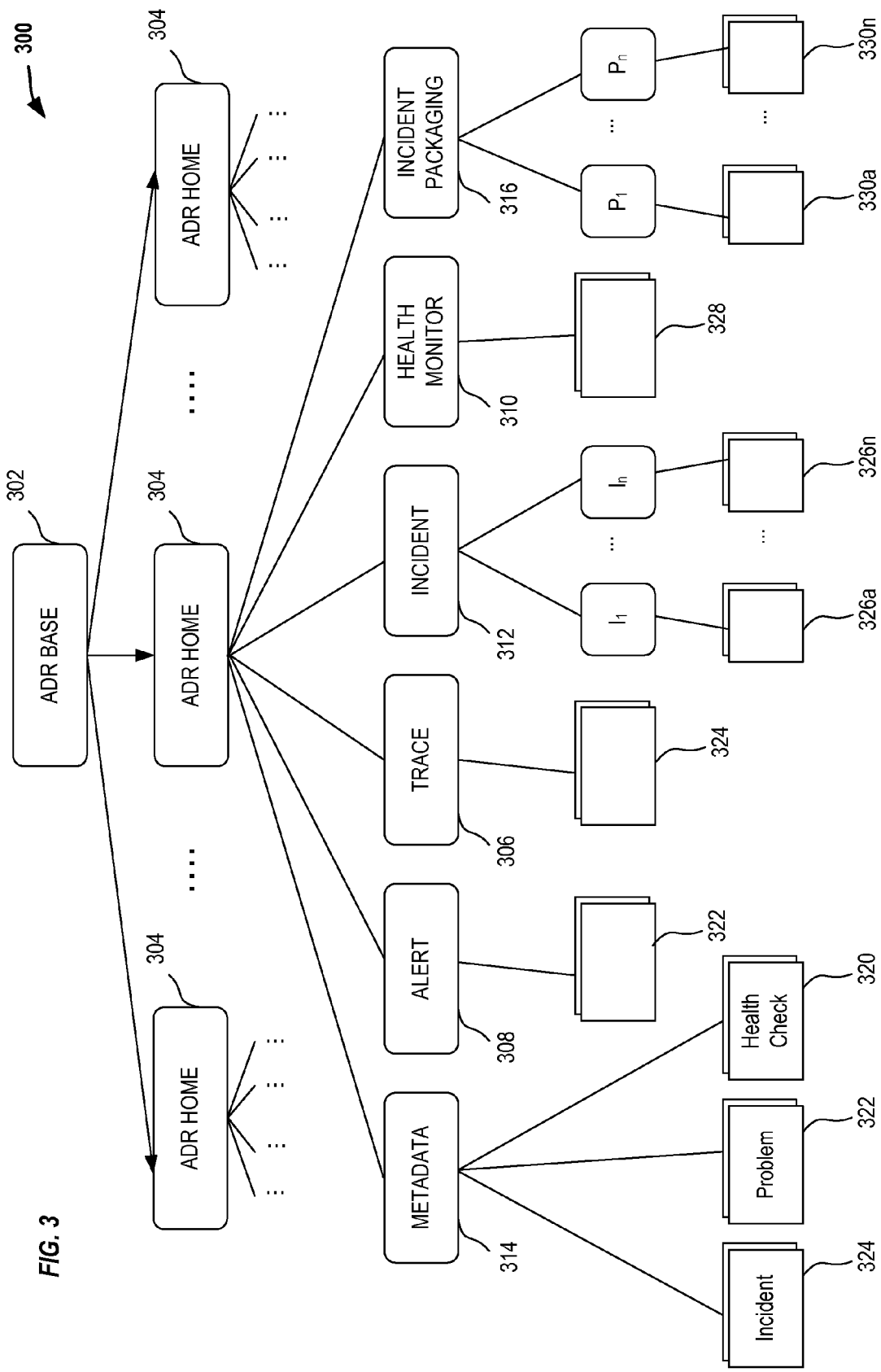
FIG. 3 is a simplified block diagram depicting a hierarchical structure for storing diagnostic data in the ADR module according to an embodiment of the present invention.

In one embodiment, the diagnostic data stored in a root directory that corresponds to a particular monitored system may also be hierarchically organized. In one embodiment, one or more sub-directories may be provided in the root directory corresponding to monitored system 110 for storing different types or categories of diagnostic data collected for the monitored system. For example, a subdirectory may be provided in the root directory representing monitored system 110 to store diagnostic data related to one or more incidents As another example, a subdirectory may be provided in the root directory representing monitored system 110 to store trace data. In one embodiment, the data within each subdirectory may also be hierarchically organized. FIG. 3 depicts an example of how diagnostic data related to a monitored system (e.g., system 110) may be hierarchically organized according to an embodiment of the present invention.

In this manner, all the diagnostic data collected for a monitored system is stored in a predictable location in a structured format. The organized storage of the data enables efficient searching and querying and also enables diagnostic tools and humans to easily process the information. This along with the metadata information, as previously described, enables querying, tracking, and finding correlations between pieces of data stored in repository 226 (e.g., the ability to track occurrences of incidents and other events).

The organized storage of the data also enables various tools to use the diagnostic data stored in repository 226. For example, tools used to navigate across multiple directories corresponding to multiple monitored systems, to search and correlate diagnostic data, to analyze diagnostic data at various levels of a software stack (e.g., look for incidents that occur for a particular "SESSION_ID" from the application level down to the physical data Various different types of diagnostic data may be collected and stored for monitored system 110. In one embodiment, repository 226 may be configured to store trace information 202 collected for system 110 that comprises information related to process environment, statuses of processes or functions to be executed by monitored system, activities such as state transitions of the processes or functions, conditions such as errors detected in monitored system 110, etc. In one embodiment, the trace information that is stored in repository 226 may have a common data format. This common data format facilitates searching or querying for relevant information and also enables various tools to manipulate the stored diagnostic data for diagnosis using a standard interface. In one embodiment, a tracing services component (sometimes referred to as unified trace service (UTS) in the embodiments described in the appendices) is configured to perform in-memory and disk-based tracing for gathering trace information for system 110.

In one embodiment, repository 226 may be configured to store information 204 related to one or more incidents that are created in response to conditions detected in system 110. The information stored for an incident may include (1) a system-assigned unique incident identifier (ID); (2) a problem key that characterizes the incident; (3) one or more incident attributes that describe the state of the incident such as the time of occurrence of the incident, incident status such as open or close (see detail description below), severity of the incident, and other attributes that describe the incident; (4) one or more correlation keys such as one or more (key, value) pairs (e.g., "key" is an arbitrary name related to some attributes of the incident such as "SESSION_ID", "PROCESS_ID", "EXECUTION_CONTEXT_ID" and "value" is a specific value that is assigned for the specific incident attribute) that can be used for correlations across multiple incidents, multiple product instances, multiple products that are managed by diagnosability framework 112, and the like; (5) metadata that describes the incident (e.g., the metadata information may include the above-described correlation keys that are used for correlation of incidents); (6) one or more incident dumps collected and stored for the incident; and other information related to the incident and other data or information related to the incident.

In one embodiment, an incident may be in one of the following states, information for which is stored in repository 226.

Collecting—This state indicates that the incident has been newly created and information is in the process of being collected for the incident. During the collecting state, information collected for the incident may be incomplete, and thus may not be ready to be packaged to be sent to diagnosis site 116.

Ready—This state indicates that information collected for the incident has been completed. The incident and the information collected for the incident are now ready to be used for analysis or to be packaged to be sent to the diagnosis site.

Tracking—This state indicates that information collected for the incident is currently being analyzed by a developer or a database administrator (DBA) at monitored system site 112 or diagnosis site 116. Therefore, the information collected for the incident is to be kept in repository 226 during the tracking state.

Closed—This state indicates that either the information collected for the incident has already been analyzed by a developer or a database administrator (DBA) at monitored system site 112 or the diagnostic data has been sent to diagnosis site 116. As a result, the information collected for the incident and other information related to the incident may be removed or deleted from repository 226.

Data-Purged—This state indicates that information collected for the incident (e.g. incident dump files) has been removed or purged from repository 226.

In one embodiment, repository 226 may be configured to store information 206 related to a problem that maps to one or more incidents. The information stored for a problem may include (1) a system-defined unique identifier (problem ID) for the problem; (2) a problem key that characterizes the faulty behavior or symptom associated with the problem; (3) information that describes occurrences of incidents related to the problem including information related to the first occurrence of an incident categorized under the problem and the most recent occurrence of an incident categorized under the problem; (5) impact of the problem on the monitored system; (6) metadata that describes the problem; (7) one or more problem attributes that describe the state of the problem; and other information related to the problem.

In one embodiment, the state of a problem may depend upon the states of the incidents that are mapped to the problem. For example, a problem is deemed to be in the "closed" state if all the incidents that are mapped to the problem are in the "closed" state. In a "closed" state, the data or information that is gathered or associated with the problem may be removed or deleted.

In one embodiment, repository 226 may be configured to store alert messages 208 generated in response to events in system 110. For example, an error related to the start up of a monitored database system may cause an alert message to be generated and written to repository 226. In one embodiment, alert messages that are stored in repository 226 may have a common data format to facilitate correlation across multiple monitored systems. A tool such as a diagnostic data repository viewer tool may be used to find correlations among the stored information.

Other types of data may also be stored in repository 226 (210) such as diagnostic data collected as a result of running health checks in monitored system 110, information collected as a result of executing one or more test cases (e.g., SQL test cases), information related to data repair records, etc. Various different components in diagnosability framework 112 may be configured to collect diagnostic data related to system 110. In one embodiment, DDE 112a is configured to gather diagnostic data that is relevant to an incident. For example, DDE 112a may be configured to gather diagnostic data related to an incident upon occurrence or detection of a condition in system 110. In another embodiment, a tracing services component such as UTS is configured to collect diagnostic data during normal operation of system 110.

In one embodiment, repository 226 may be configured to store information 212 that is not generated by diagnosability framework 112. The externally generated information may be stored in one or more files and file pointers associated with the external files are stored in repository 226 to point to these files.

In one embodiment, the data stored in repository 226 may be stored in a database table comprising one or more fields (i.e., columns). For example, information related to an incident (e.g., incident ID, incident status, incident correlation keys) may be stored in a table. As another example, information related to a problem (e.g., problem ID, problem states, problem key, etc.) may be stored in a separate table. In one embodiment, the data stored in a table may be queried by one or more tools. For example, incidents may be tracked based on information such as "SESSION_ID" and/or the like.

In one embodiment, ADR module 112b may include a service module 214 comprising one or more service components that are configured to provide various different services to support the diagnostic data stored in repository 226. For example, service module 214 may include the following components:

File Service Module 224—This module provides one or more application programmable interfaces (APIs) to manage and navigate the directory structure in repository 226 and to perform basic I/O operations to repository 226.

Metadata Service Module 218—This module supports the storage of diagnostic data in a structured format (i.e., data stored in a database table comprising one or more columns) in repository 226. For example, metadata service module 218 may store metadata information related to an incident (e.g., incident ID, incident status, incident correlation keys) in a table in repository 226.

Alert Service 222—This module provides support for the generation and accesses to alert messages stored in repository 226.

Utility Service Module 216—This module provides various different utility functions for the data stored in repository 226. The utility functions may include (1) a function that enables a root directory corresponding to a particular monitored system (e.g., ADR_HOME directory) to be moved from a base directory (a base directory such as ADR_BASE comprises one or more root directories corresponding to multiple monitored systems) to another base directory; (2) a packaging utility that enables a portion of diagnostic data stored in a root directory representing a monitored system to be packaged and transported to another machine (e.g., diagnosis site 116); (3) an auto purging service function that enables a portion of diagnostic data stored in repository 226 to be automatically purged after reaching a certain age limit; and other utility functions. The age limit (or retention duration) may be configured by users. In this manner, ADR module 112b is self managing and requires very little to no intervention from users on regular maintenance chores.

Viewer Service Module 220—This module provides the application programmable interfaces (APIs) and tools for viewing data stored in repository 226.

In one embodiment, ADR module 112b is architected such that it is available even if monitored system 110 is non-operational. For example, querying data stored in repository 226 for a database system does not require that the database system be up and functioning. Accordingly, ADR module 112b's availability and operation are independent of the underlying system being monitored.

ADR module 112b may also be configured to automatically partition the stored data in repository 226 to make the data more manageable. For example, the data stored in repository 226 may be partitioned based on the data size or some other criteria.

In one embodiment, ADR 112b may be configured to be resilient to imperfect conditions that may exist in repository 226. For example, if users accidentally remove a file from repository 226, diagnostic tools are still be able to process the subset of intact data inside the repository. This increases the availability of the diagnostic data in repository 226. Accordingly, problems associated with portions of repository 226 do not render the entire repository 226 unusable.

ADR module 112b may also be configured to repair or regenerate the data or portions of data stored in repository 226. For example, if a file is inadvertently deleted from an ADR_HOME directory in repository 226, ADR module 112b can detect such a deletion and regenerate the deleted file based on the trace files and other data that are stored under the ADR_HOME directory.

FIG. 3 is a simplified block diagram depicting a hierarchical structure for storing diagnostic data in ADR module 112b according to an embodiment of the present invention. FIG. 3 is merely illustrative of an embodiment incorporating the present invention and does not limit the scope of the invention as recited in the claims. One of ordinary skill in the art would recognize other variations, modifications, and alternative. For example, the directory structure illustrated in FIG. 3 may have less or more components and/or levels of abstractions than those shown in FIG. 3.

As mentioned previously, ADR 112b provides a centralized repository for storing diagnostic data related to multiple monitored systems. The repository may be organized in a hierarchical manner to facilitate proper organization of the diagnostic data related to multiple monitored systems. In one embodiment, a root directory comprising one or more subdirectories may be provided for storing diagnostic data collected for each of the multiple monitored systems such as system 110. Multiple root directories may be provided under a common base directory for storing diagnostic data corresponding to multiple monitored systems. This enables correlation of diagnostic data across multiple monitored systems.

As depicted in FIG. 3, ADR module 112b may include a common base directory ADR_BASE 302 that serves as the physical mount point of one or more ADR_HOME directories 304. Each ADR_HOME directory 304 under the common ADR_BASE directory 302 is configured to store diagnostic data collected for a particular monitored system such as system 110. By storing multiple ADR_HOME directories under a single ADR_BASE directory, diagnostic data collected for multiple monitored systems may be stored under a common base directory. This not only organizes storage of diagnostic data under a common directory but also enables correlation of diagnostic data across multiple monitored systems.

The diagnostic data collected for monitored system 110 may be stored in a hierarchical manner in ADR_HOME directory 304 that is allocated to monitored system 110. For example, one or more subdirectories may be provided under ADR_HOME 304, each subdirectory configured to store a portion of the diagnostic data collected for system 110. In one embodiment, the structure of each ADR_HOME directory 304 including its subdirectories is the same for all the ADR_HOME directories. This commonality of structure enables diagnostic data to be organized in a predictable manner across multiple monitored systems. This predictable organization facilitates efficient identifying of relevant data to be packaged and communicated to diagnosis site 116 and also enables tools to be engineered to process the diagnostic data stored for multiple monitored systems.

In one embodiment, ADR_HOME directory 304 may comprise several subdirectories. In one embodiment, a subdirectory 306 is provided under ADR_HOME directory 304 that is configured to store trace information that is collected during normal operation of system 110. The trace information may be stored in one or more files 324 under subdirectory 306. The trace information may be stored in a particular format that facilitates the use of various tools on the information.

In one embodiment, a subdirectory 312 is provided under ADR_HOME directory 304 that is configured to store information related to one or more incidents created in system 110. In one embodiment, subdirectory 312 may comprises multiple subdirectories $I_1$ to $I_n$, each subdirectory $I_1$ to $I_n$ configured to store information related to a particular incident. The information stored for an incident (e.g., information 326a stored for incident corresponding to $I_1$ or information 326n stored for incident corresponding to $I_n$) may include information such as when the incident was created, the failures that caused creation of the incident, the time that the incident was created, correlation keys for the stored information (may also be stored in the metadata subdirectory 314), dumps of different types related to the incident, and other incident related information. In one embodiment, the name of the directory storing information for an incident may be named such that the identity of the incident can be easily determined from the name of the directory.

In one embodiment, a subdirectory 314 is provided under ADR_HOME directory 304 that is configured to store metadata information. In one embodiment, the metadata information may be stored in one or more files. The files may be organized based upon the information stored in the files. The files may be in the form of one or more database tables with each table comprising one or more columns or fields. For example, subdirectory 314 may include a table 320 for storing metadata information related to one or more health checks executed in system 110, a table 322 for storing metadata information related to a problem that corresponds to one or more incidents, a table 324 for storing metadata information related to an incident that is created in response to a condition in system 110, and other tables for storing other types of metadata information. In this manner, the metadata information stored in these tables enables querying, tracking, and finding correlations between pieces of data stored in repository 226 (e.g., the ability to track occurrences of incidents and other events based on the metadata information such as "SESSION_ID, "PROCESS_ID").

In one embodiment, a subdirectory 308 is provided under ADR_HOME directory 304 that is configured to store one or more alert log messages. In one embodiment, the alert log messages may be stored in one or more files 322. The alert messages information may be stored in a particular format that facilitates the use of various tools on the information.

In one embodiment, a subdirectory 310 is provided under ADR_HOME directory 304 that is configured to store information related to one or more health checks that are executed in system 110. The information may be stored in the form of one or more files 328. The information stored in directory 310 may include information such as when a health check was executed, the failures that caused the execution of the health check, correlation keys for the stored information (may also be stored in the metadata directory 314), dumps of different types related to the health checks, and other information related to the health checks.

In one embodiment, a subdirectory 316 is provided under ADR_HOME directory 304 that is configured to store to store information related to packaged diagnostics that is to be communicated to the diagnosis site 116. The information may be stored in multiple subdirectories $P_1$ to $P_n$ with each subdirectory storing information for a particular problem. As mentioned above, a problem maps to one or more incidents created in system 110. The information stored in each subdirectory $P_1$ to $P_n$ (e.g., information 330a stored in directory $P_1$, information 330n stored in directory $P_n$) may include information such as when a problem was detected, the problem identifier that identifies the problem, correlation keys for the stored information (may also be stored in the metadata directory 314), dumps of different types related to the problem, and other related information. In one embodiment, the name of the directory storing information for a problem may be named such that the identity of the problem can be easily determined from the name of the directory.

By storing all the diagnostic data collected for monitored system 110 in a manner as described above and by storing metadata information for the diagnostic data in the same hierarchical structure, the diagnostic data can be used by software tools and humans in an organized fashion. For example, vendors can easily provide software tools that operate on ADR module 112b to package related diagnostic data for a monitored system for diagnostic purposes. In addition, the ability to correlate diagnostics across different layers of the same monitored system or across multiple monitored systems enables problem diagnosis to be performed more accurately and efficiently, including identifying and debugging related problems, recognizing patterns of problems across different monitored systems, and the like. This reduces the amount of time needed for collecting relevant diagnostic data and diagnosing a problem, which in turn reduces the overall cost of fault diagnosis.

As described above, DDE module 112b may be configured to automatically purge data that is no longer needed or that is deemed to have expired to prevent the repository 226. This helps to efficiently manage the amount of disk space used for storing the diagnostic data. In one embodiment, ADR module 112b may be configured to automatically remove incidents-related diagnostic data for incidents that are deemed to be in the closed state. ADR module 112b may also be configured to control the retention of incident data based on some retention policies configured for ADR module 112b. For example, an incident metadata retention policy may be configured for ADR module 112b that controls how long the metadata related to incidents is stored in ADR module 112b (e.g., a default setting may be set to one year). As another example, an incident dump files policy may be configured for ADR module 112b that controls how long the collected incident dumps and files are stored in ADR module 112b (e.g., a default setting may be set to one month). In this manner, ADR module 112b can automatically purge diagnostic data related to incidents based on the type of diagnostic data collected for the incidents (i.e., incident metadata or incident dump files) and the specific retention policy configured for ADR module 112b. The retention policies may be user configurable to allow users to specify how long they want the diagnostic data collected for an incident to be stored in ADR module 112b.

Figure 4:
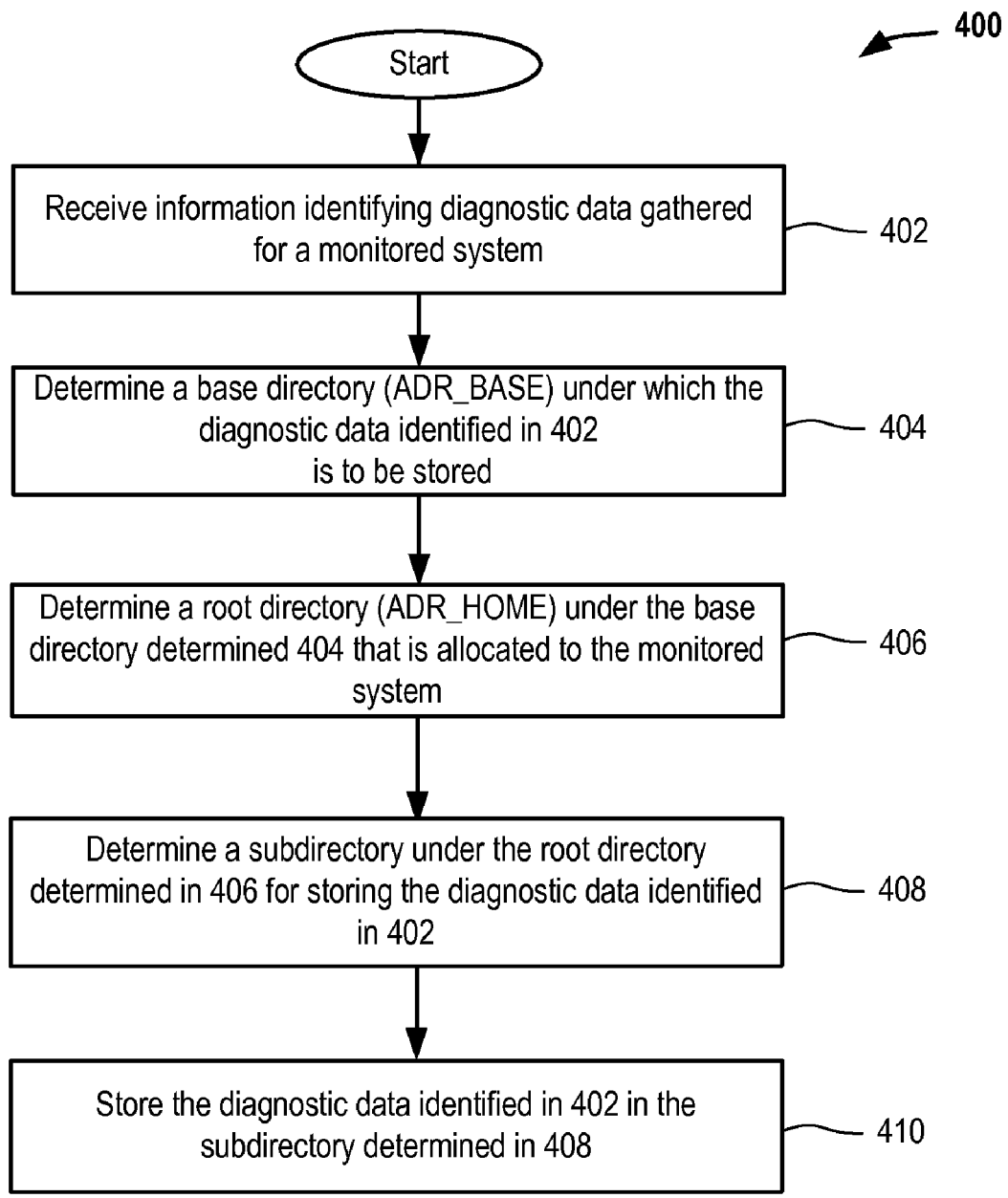
FIG. 4 is a simplified flow diagram illustrating a method for storing and organizing diagnostic data in the ADR module according to an embodiment of the present invention.

FIG. 4 is a simplified flow diagram 400 illustrating a method for storing and organizing diagnostic data in ADR module 112b according to an embodiment of the present invention. The processing depicted in FIG. 4 may be performed by software (executed by a processor), hardware, or combinations thereof.

Referring to FIG. 4, at 402, information is received identifying diagnostic data gathered for a monitored system such as system 110. In one embodiment, the information in 402 may be received by ADR module 112b. Various different types of diagnostic data may be gathered for monitored system 110 including traces, dumps, alert logs, health monitor reports, data repair records, metadata information, information related to incidents, information related to problems, and the like.

At 404, processing determines a base directory under which the diagnostic data collected for the monitored system is to be stored. As mentioned previously, there may be multiple root directories corresponding to multiple monitored systems under a base directory. For example, a first directory may store diagnostic data for an instance of product X, a second directory may store diagnostic data for another instance of product X, a third directory may store diagnostic data for an instance of product Y, and so on. In this manner, diagnostic data for multiple monitored systems may be stored in one centralized location under one common base directory. This also enables finding correlations across multiple monitored systems.

At 406, processing determines a root directory under the base directory determined in 404 that is allocated to the monitored system. This may include identify an existing root directory that is allocated to the monitored system or creating a new root directory and allocate the newly created root directory to the monitored system. For example, a root directory may be provided in repository 226 to represent a monitored system such as system 110 and diagnostic data related to the monitored system may be stored under that root directory.

At 408, processing determines a subdirectory under the root directory determined in 406 for storing the diagnostic data identified in 402. As mentioned previously, one or more subdirectories may be provided in a root directory corresponding to a monitored system (e.g., system 110) for storing different types or categories of diagnostic data collected for the monitored system. For example, a subdirectory may be provided in the root directory representing monitored system 110 to store diagnostic data related to one or more incidents As another example, a subdirectory may be provided in the root directory representing monitored system 110 to store trace data. In one embodiment, the data within each subdirectory may also be hierarchically organized.

At 410, the diagnostic data identified in 402 is stored in the subdirectory determined in 408. In one embodiment, the diagnostic data identified in 402 may be stored in one or more files in the subdirectory determined in 408. The files may be organized based upon the information stored in the files. The files may be in the form of one or more database tables with each table comprising one or more columns or fields. For example, the subdirectory determined in 408 may include a table for storing information related to one or more health checks executed in system 110, a table for storing information related to a problem that corresponds to one or more incidents, a table for storing information related to an incident that is created in response to a condition in system 110, and other tables for storing other types of information. In this manner, the information stored in these tables enables querying, tracking, and finding correlations between pieces of data stored in repository 226 (e.g., the ability to track occurrences of incidents and other events based on the information stored such as "SESSION_ID, "PROCESS_ID").

Figure 5:
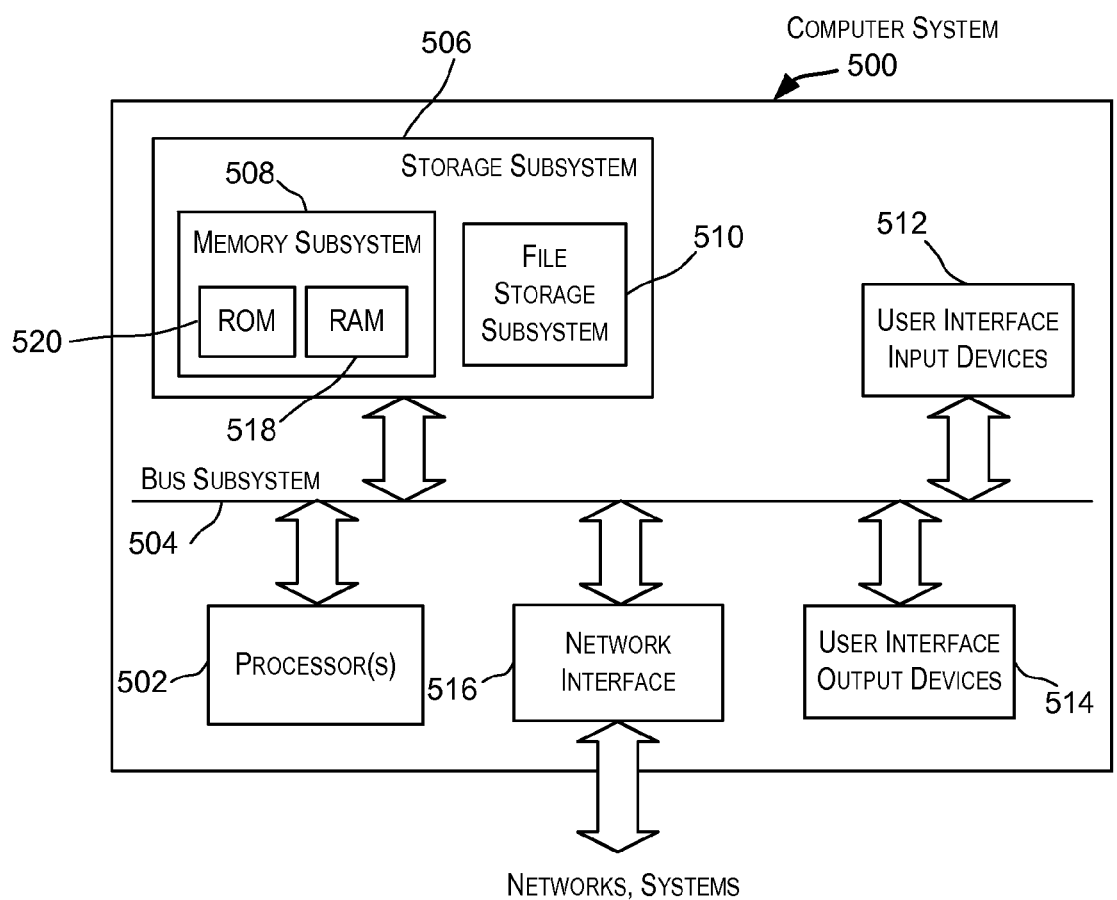
FIG. 5 is a simplified block diagram of a computer system that may be used to practice diagnostic data organizing and storing according to an embodiment of the present invention.

FIG. 5 is a simplified block diagram of a computer system 500 that may be used to practice an embodiment of the various inventions described in this application. A computer system 500 at a monitored system site may serve as the platform for diagnosability framework 112 depicted in FIG. 1. Another computer system 500 located at a diagnosis site may serve as a platform for diagnosability framework 116. A diagnosability framework, such as diagnosability framework 112, may also be distributed across multiple computer systems.

As shown in FIG. 5, computer system 500 includes a processor 502 that communicates with a number of peripheral subsystems via a bus subsystem 504. These peripheral subsystems may include a storage subsystem 506, comprising a memory subsystem 508 and a file storage subsystem 510, user interface input devices 512, user interface output devices 514, and a network interface subsystem 516.

Bus subsystem 504 provides a mechanism for letting the various components and subsystems of computer system 500 communicate with each other as intended. Although bus subsystem 504 is shown schematically as a single bus, alternative embodiments of the bus subsystem may utilize multiple busses.

Network interface subsystem 516 provides an interface to other computer systems, networks, and portals. Network interface subsystem 516 serves as an interface for receiving data from and transmitting data to other systems from computer system 500. For example, for the diagnosability framework deployed at the customer site or site where the software system is deployed, network interface subsystem 516 may be configured to transfer diagnostic packages from the customer site to the vendor or diagnosis site.

User interface input devices 512 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 500.

User interface output devices 514 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 provides a computer-readable medium for storing the basic programming and data constructs that provide the functionality of the present invention. Software (code modules or instructions) that provides the functionality of the present invention may be stored in storage subsystem 506. These software modules or instructions may be executed by processor(s) 502. Storage subsystem 506 may also provide a repository for storing data used in accordance with the present invention such as the diagnostic data repository. Storage subsystem 506 may comprise memory subsystem 508 and file/disk storage subsystem 510.

Memory subsystem 508 may include a number of memories including a main random access memory (RAM) 518 for storage of instructions and data during program execution and a read only memory (ROM) 520 in which fixed instructions are stored. File storage subsystem 510 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 500 can be of various types including a personal computer, a portable computer, a workstation, a network computer, a mainframe, a kiosk, a server or any other data processing system. Due to the ever-changing nature of computers and networks, the description of computer system 500 depicted in FIG. 5 is intended only as a specific example for purposes of illustrating the preferred embodiment of the computer system. Many other configurations having more or fewer components than the system depicted in FIG. 5 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for organizing and storing diagnostic data in a diagnostic data repository comprising:
    storing, by a computer system, first diagnostic data related to a first monitored system in a first directory in the diagnostic data repository, the first diagnostic data including a first correlation key associated with an attribute name
    storing, by the computer system, second diagnostic data related to a second monitored system in a second directory in the diagnostic data repository, the second diagnostic data including a second correlation key associated with the attribute name; and
    determining, by the computer system, whether the first and second diagnostic data are correlated,
    wherein the first and second diagnostic data are correlated when the first and second directories are stored under a common base directory and the first correlation key matches the second correlation key.

2. The method of claim 1 wherein storing the first diagnostic data related to the first monitored system comprises storing diagnostic data related to a first product instance.

3. The method of claim 1 wherein storing the second diagnostic data related to the second monitored system comprises storing diagnostic data related to a second product instance.

4. The method of claim 1 wherein storing the first diagnostic data related to the first monitored system comprises:
    storing, by the computer system, information related to one or more incidents for the first monitored system in one or more corresponding sub-directories of the first directory, the one or more incidents associated with one or more problem keys and symptoms; and
    limiting, by the computer system, the number of stored incidents having the same problem key and symptom.

5. The method of claim 4 wherein the one or more incidents are identified by one or more names of the or more corresponding sub-directories.

6. The method of claim 4 wherein storing the information related to the incidents for the first monitored system comprises storing a problem key for each of the incidents.

7. The method of claim 1 wherein storing the first diagnostic data related to the first monitored system comprises storing information related to one or more health checks for the first monitored system.

8. The method of claim 1 wherein storing the first diagnostic data related to the first monitored system comprises storing information related to one or more problems.

9. The method of claim 1 wherein the first diagnostic data related to the first monitored system is stored in one or more tables.

10. The method of claim 1 further comprising automatically deleting a portion of the first diagnostic data related to the first monitored system from the diagnostic data repository based upon a user-configurable retention policy.

11. A computer readable storage medium storing a plurality of instructions for controlling a processor to organize and store diagnostic data in a diagnostic data repository, the plurality of instructions comprising:
    instructions that cause the processor to store first diagnostic data related to a first monitored system in a first directory in the diagnostic data repository, the first diagnostic data including a first correlation key associated with an attribute name;
    instructions that cause the processor to store second diagnostic data related to a second monitored system in a second directory in the diagnostic data repository, the second diagnostic data including a second correlation key associated with the attribute name;
    instructions that cause the processor to determine whether the first and second diagnostic data are correlated,
    wherein the first and second diagnostic data are correlated when the first and second directories are stored under a common base directory and the first correlation key matches the second correlation key.

12. The computer readable storage medium of claim 11 wherein the instructions that cause the processor to store the first diagnostic data related to the first monitored system comprise instructions that cause the processor to store information related to one or more incidents for the first monitored system.

13. The computer readable storage medium of claim 11 wherein the instructions that cause the processor to store the first diagnostic data related to the first monitored system comprise instructions that cause the processor to store metadata information, the metadata information including one or more correlation keys.

14. The computer readable storage medium of claim 11 wherein the instructions that cause the processor to store the first diagnostic data related to the first monitored system comprise instructions that cause the processor to store information related to one or more health checks for the first monitored system.

15. The computer readable storage medium of claim 11 wherein the instructions that cause the processor to store the first diagnostic data related to the first monitored system comprise instructions that cause the processor to store information related to packaged diagnostics that is to be communicated to a diagnosis site.

16. The computer readable storage medium of claim 11 wherein the instructions that cause the processor to store the first diagnostic data related to the first monitored system comprise instructions that cause the processor to store information related to one or more problems.

17. A system for organizing and storing diagnostic data in a diagnostic data repository, the system comprising:
   a memory; and
   a processor coupled to the memory;
   wherein the processor is configured to:
      store first diagnostic data related to a first monitored system in a first directory in the diagnostic data repository, the first diagnostic data including a first correlation key associated with an attribute name;
      store second diagnostic data related to a second monitored system in a second directory in the diagnostic data repository, the second diagnostic data including a second correlation key associated with the attribute name; and
   determine whether the first and second diagnostic data are correlated,
   wherein the first and second diagnostic data are correlated when the first and second directories are stored under a common base directory and the first correlation key matches the second correlation key.

* * * * *

UNITED STATES PATENT AND TRADEMARK OFFICE
CERTIFICATE OF CORRECTION

| | | |
|---|---|---|
| PATENT NO. | : 8,135,995 B2 | Page 1 of 1 |
| APPLICATION NO. | : 12/251661 | |
| DATED | : March 13, 2012 | |
| INVENTOR(S) | : Ngai et al. | |

It is certified that error appears in the above-identified patent and that said Letters Patent is hereby corrected as shown below:

In column 8, line 67, delete "incidents" and insert -- incidents. --, therefor.

In column 9, line 25, delete "data" and insert -- data. --, therefor.

In column 14, line 10, delete "to store to store" and insert -- to store --, therefor.

In column 15, line 48, delete "incidents" and insert -- incidents. --, therefor.

In column 17, line 53, in Claim 1, after "name" insert -- ; --.

In column 18, line 14, in Claim 5, after "the" insert -- one --.

Signed and Sealed this
Fifth Day of June, 2012

David J. Kappos
*Director of the United States Patent and Trademark Office*